United States Patent [19]

Eberle

[11] 4,206,601
[45] Jun. 10, 1980

[54] COMPRESSED AIR PRODUCING, TIDAL AND WAVE-POWER COLLECTION APPARATUS FOR INSTALLATION IN LARGE BODIES OF WATER

[75] Inventor: William J. Eberle, 2406 Wassner Dr., Reading, Pa. 19609

[73] Assignee: Benasutti Asst., Ltd., 1617 J.F. Kennedy Blvd.

[21] Appl. No.: 918,727

[22] Filed: Jun. 26, 1978

[51] Int. Cl.² .......................... E02B 9/08; F03B 13/12
[52] U.S. Cl. .......................................... 60/398; 60/497; 60/505; 405/76; 417/330
[58] Field of Search .................. 60/371, 398, 407, 412, 60/495, 497, 498, 501, 505; 290/42, 53; 405/76, 195; 417/100, 330, 331, 333, 337

[56] References Cited

U.S. PATENT DOCUMENTS

| 242,233 | 5/1881 | Swales | 60/496 |
|---|---|---|---|
| 321,229 | 6/1885 | Leavitt | 60/507 |
| 366,768 | 7/1887 | Elias | 405/76 X |
| 581,067 | 4/1897 | Fletcher | 60/497 |
| 706,620 | 8/1902 | Williams | 417/333 |
| 739,538 | 9/1903 | Fredson | 60/507 |
| 787,182 | 4/1905 | Hutchings | 60/502 |
| 791,366 | 5/1905 | Rapp | 60/507 |
| 852,232 | 4/1907 | Kohler | 60/398 |
| 879,992 | 2/1908 | Wilson | 417/331 |
| 884,080 | 4/1908 | Fallis | 60/507 |
| 974,157 | 11/1910 | King | 337/315 |
| 1,377,163 | 5/1921 | Pool | 60/497 |
| 1,389,445 | 8/1921 | Hare | 417/333 |
| 1,403,702 | 1/1922 | Melvin | 60/496 |
| 1,471,222 | 10/1923 | Taylor | 60/496 |
| 1,623,341 | 4/1927 | Hare | 60/398 X |
| 1,647,025 | 10/1927 | Stich | 60/498 |
| 2,668,918 | 2/1954 | Howell | 290/53 |
| 2,706,077 | 4/1955 | Searcy | 417/333 |
| 2,749,085 | 6/1956 | Searcy | 60/505 |
| 3,487,228 | 12/1969 | Kriegel | 290/52 |

Primary Examiner—Edgar W. Geoghegan
Attorney, Agent, or Firm—Benasutti Associates, Ltd.

[57] ABSTRACT

A novel tidal and wave-power collection apparatus is disclosed which is well suited for oceanic installations. In the preferred embodiment, a matrix of power collection units is easily assembled at sea, each being bridged and reinforced by catwalks extending therebetween which form trilateral power collection modules having such units at each of the corners thereof. Each power collection unit comprises a central tubular pilaster embedded in the ocean floor around which is disposed a toroidal float which moves up and down with the waves and tide and which acts to drive an air compressor while rising and falling. The output of the air compressor, i.e. compressed air, is stored in the float's chamber and is transmitted through conduits in the bridging structure to a remote power consumption site. The apparatus is efficient, economical and capable of capturing and storing large quantities of power which may be utilized to satisfy peak load power demands.

17 Claims, 5 Drawing Figures

COMPRESSED AIR PRODUCING, TIDAL AND WAVE-POWER COLLECTION APPARATUS FOR INSTALLATION IN LARGE BODIES OF WATER

BACKGROUND OF THE INVENTION

It has long been recognized that waves and/or tidal forces contain tremendous amounts of potential energy which, if harnessed, could not only supply substantial power but might also, if appropriately installed, protect large areas of shore line from the ravages of oceanic erosion.

In the prior art, extensive patent literature exists dealing with the subject of "wave motors" and relating to various ways of utilizing floats which rise and fall with passing waves, the movement of the floats being translated by various means into mechanical energy, and then into electrical energy. For example, U.S. Pat. Nos. 321,229 and 1,647,025 disclose compressed air storage in combination with a wave motor. U.S. Pat. No. 2,706,077 is titled "Ocean Wave Air Compressor". Other forms of energy storing means are known to this art, including means utilizing balance wheels or flywheels in combination with various mechanisms for supplying power from waves. Additionally, the art teaches the use of multiple pontoons, or floats, the floats being arranged in various ways for improving the continuity of power derived from the passing waves, while occasionally also showing means for deriving energy from the lateral motion of waves as well as from the up and down motion of waves. In these regards, please refer to U.S. Pat. Nos. 242,233; 787,182; 879,992; 975,157; 1,403,702; 1,471,222; 2,668,918; 3,487,228; 739,538; 2,749,085; 581,067; 1,377,163; 791,366; and 884,080.

While many of the devices disclosed in the prior art are no doubt operative, the failure of such devices to gain widespread acceptance suggests that these devices may, in practice, be too expensive, complex, and difficult to maintain to serve as practical energy sources.

SUMMARY OF THE INVENTION

The present invention overcomes many of the disadvantages of the prior art by providing an extremely simple, economical device for capturing substantial amounts of energy and converting that energy into compressed air which is stored within the floats of each power unit. This compressed air may then be supplied through conduits as needed, as for example to satisfy the peak demands at a remote power consumption site.

The preferred embodiment device of the present invention comprises a plurality of tubular members which have been designed to facilitate on site "at sea" assembly. Each of the power collection units comprises a central, substantially cylindrical pilaster around which a toroidal (donut-shaped) float is trackingly mounted. One end of the cylindrical pilaster is embedded in the ocean floor and the pilaster extends vertically through the water to protrude some distance above the highest expected high water line. Each pilaster is interconnected to at least two adjacent pilasters by tubular bridging members which serve to reinforce the pilasters, to house high pressure conduits, and to act as pedestrian catwalks to facilitate servicing of each power collection unit. In the preferred embodiment, the floats are manufactured in accurate tubular sections which have flanges formed thereon which, upon assembly, create high pressure seals between sections to define a compressed air cavity within the float. Portions of these flanges additionally act in combination with axles mounted therebetween to position wheels which track up and down the outside surface of the pilaster. Portions of these flanges also act as attachment sites for several rack and pinion drives which power a drive shaft in response to the ascension and descension of the float with respect to the pilaster.

As seen from the above, a primary object of the present invention is the provision of a superior tidal and wave-power collection apparatus which is easily assembled and installed at sea.

Another object of the present invention is the provision of such an apparatus which may produce, store, and supply substantial amounts of compressed air which has been captured by converting tidal and wave energy into compressed air.

These and other objects of the present invention will become apparent from the following more detailed description.

DESCRIPTION OF THE PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

Figure 1:
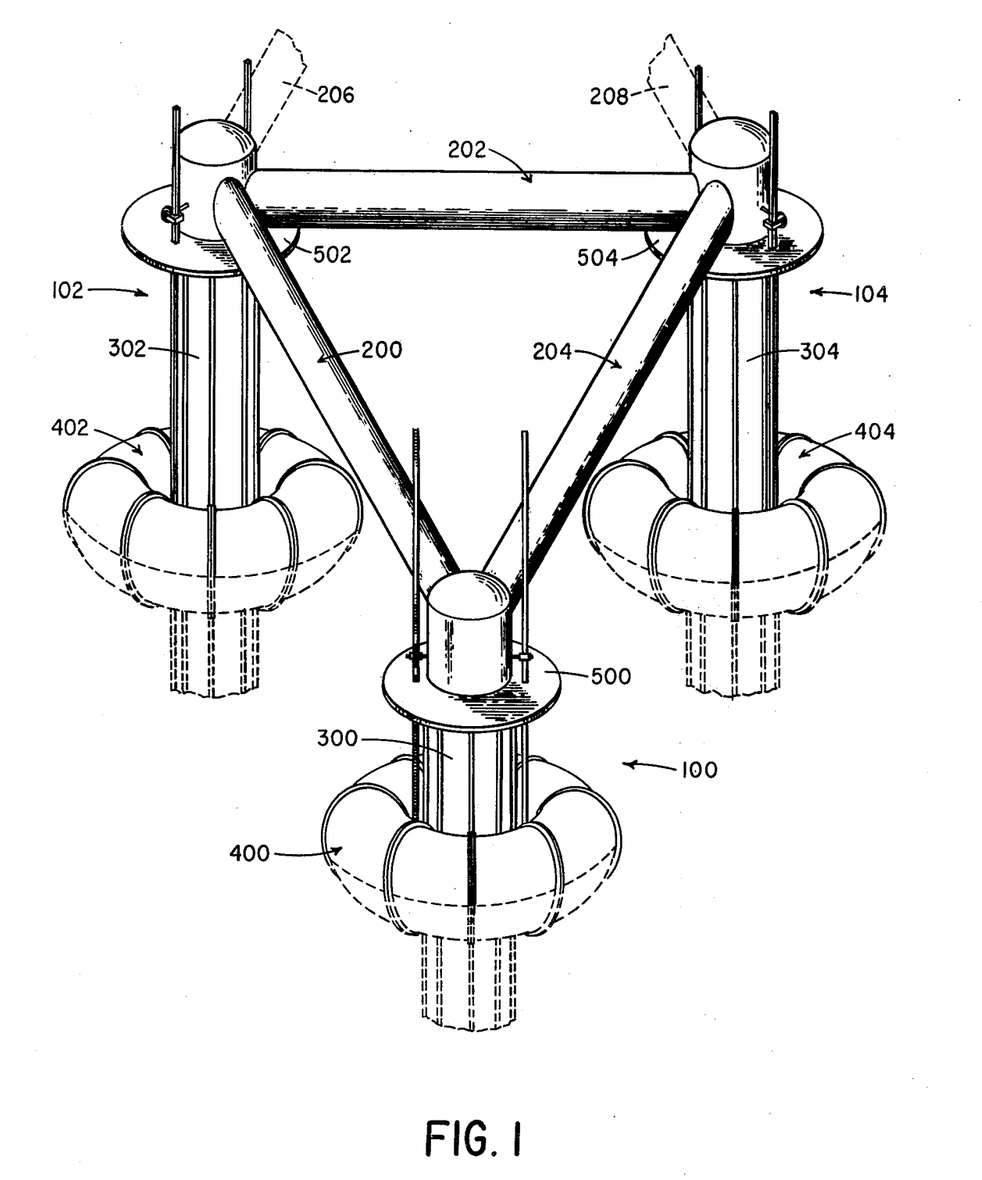
FIG. 1 is an isometric view of a single power collection module having three preferred embodiment power collection units disposed at the corners thereof, connections to other unit(s) and portions of each unit disposed below the water line being represented in phantom.

Referring now to the figures, and particularly FIG. 1, the preferred embodiment wave power collection apparatus should be installed in a relatively large body of water for converting wave and tidal energy into high pressure compressed air. The preferred embodiment apparatus further is capable of collecting and storing air in the apparatus, and for transmitting the compressed air to a preselected consumption site. The preferred embodiment apparatus generally comprises a plurality of power collection units which are structurally interconnected by bridging means for rigidly connecting the power collection means to create a rigid power collection module. In the preferred embodiment, at least three power collection units are interconnected to form a trilateral power collection module which is capable of withstanding any lateral forces which might be applied there against by ocean currents or winds. In FIG. 1, power collection units designated generally 100, 102, and 104 are illustrated which are interconnected by bridging members designated generally 200, 202, and 204. Each power collection unit comprises a central pilasater, such as pilasters 300, 302, and 304 which are substantially cylindrical structures which are driven into the sea bed or floor and which extend as shown in FIG. 1 for a preselected distance above the expected high water mark for a given location. Floats designated generally 400, 402, and 404 are trackingly mounted for substantially vertical movement up and down their respective pilasters, such that the movement of these floats will drive rack and pinion mechansims associated therewith to drive a fly wheel and ultimately a compressor which are disposed in the hollow upper portion of the pilaster. Compressed air produced thereby is fed into the floats 400, 402, and 404 for storage, and/or is fed into conduits which are housed in the bridging members 200, 202, and 204 for eventual transmission from unit to unit and then to a remote power consumption site.

FIG. 1 illustrates the minimum number of power collection units which may be used in a single installation. In phantom in FIG. 1, however, connections to an additional power collection unit as illustrated by the phantom bridging members 206 and 208 which may be used to interconnect this additional unit to power collection units 100 and 102 to expand the apparatus and to create therewith a second trilateral collection module. Accordingly, as power requirements increase, it is a relatively simple matter to expand the system to accommodate the needs of any particular power consumption site.

As shown particularly in FIG. 1, the bridging means, such as bridging members 200, 202, and 204, are substantially tubular and have eliptical cross-sections. In the preferred embodiment, these members are sized to act as catwalks which facilitate pedestrian movement between one power collection unit and the next. By orienting the axis of the eliptical cross-section substantially vertically, the bridging members are not only configured for easy pedestrian movement therethrough, but are also configured to permit the power collection units to be disposed at substantial distances apart, yet be spanned by relatively simple bridging structures. Finally, due to the enclosed nature of the catwalks maintenance workers servicing the power modules are well protected from the environment.

In order to limit the maximum vertical travel of each of the floats in an upward direction and also to provide a deck for use in servicing various portions of the apparatus, a substantially planar, annular deck is provided such as decks 500, 502, and 504. During assembly these decks may act to temporarily support the bridging members prior to their permanent attachment to the pilasters.

Figure 2:
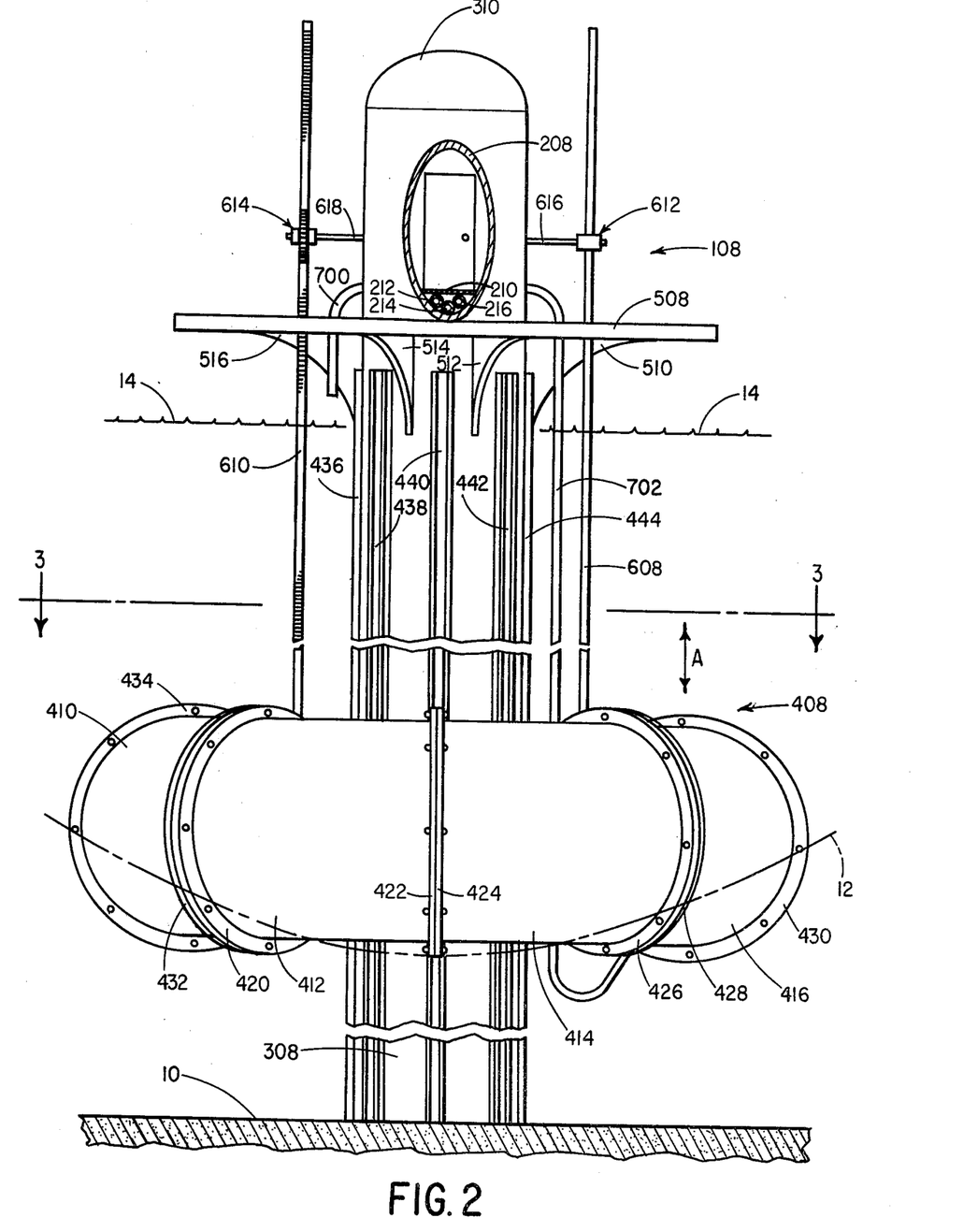
FIG. 2 is a front view on an enlarged scale of a power collection unit similar to that illustrated in FIG. 1, the height of which has been foreshortened for purposes of illustration, and portions of an elliptical tubular bridging member and high pressure transmission conduits being shown in cross-section.

The float 408 is seen in FIG. 2 to encircle the pilaster and to be trackingly mounted with respect thereto for movement in response to variations in water level, that is, so that the float may travel in directions which are substantially parallel to the axis of the pilaster. The float itself comprises a plurality of float sections, such as float sections 410–417. Each of these sections is preferably identical to the other. At either end of each section are outwardly depending flanges, such as outwardly depending flanges 420 and 422 for section 412; 424 and 426 for section 414; 428 and 430 for section 416; and 432 and 434 for section 410. As shown particularly in FIGS. 2 and 3, these outwardly depending flanges are complementally configured to bolt to the outwardly extending flanges of the adjacent float sections to thereby form a high pressure seal therebetween, and to create a compression chamber within the float which is not only water tight so that the float will not become swamped with water which might otherwise seep between the flanges, but also gas-tight to contain compressed air within the float so that the float may act as a compressed air reservoir. In order to stabilize and guide the movement of the float 408 a plurality of tracks, such as tracks 436–442 and 444 are applied to the exterior surface of pilaster 308, one for each intersection between adjacent float sections, which tracks receive and guide wheels (two for each track) generally disposed between the float 408 and the pilaster 308, as illustrated particularly in FIG. 4. In FIG. 2 the water level, indicated by line 12, is shown buoying the float 408 in a relatively low position with respect to the pilaster and other equipment mounted thereon. Attached to various places on the float are a plurality of racks, such as racks 608 and 610 which are pivotally connected at one end to portions of the float 408. These racks extend through openings in the deck 508 and engage pinion assemblies designated generally 612 and 614 which are oscillated in opposite rotational directions in response to the up and down movement of the racks 608 and 610. This rack movement is produced by movement of float 408 in the directions illustrated by double ended arrow A. The pinion assemblies 612 and 614 are mounted on remote ends of clutched drive shafts 616 and 618.

A fluid intake conduit for supplying fluids to the air compressor located within the upper portion of the pilaster extends through an opening in deck 508 downwardly to a point between the highest expected high water line 14 and the undersurface of the deck 508. By orienting the fluid intake means in this position, the fluid intake will normally supply air to the compressor but will be under water in the event that the expected high water mark is exceeded, as for example under hurricane conditions. In this event, weather conditions may be so severe that protection of the apparatus from destruction by such forces may become a matter of primary importance. Accordingly, the fluid intake conduit 700 will, under these conditions, supply sea water to the compressor. Since the output of the compressor communicates through output conduit 702 with the interior of the float 408, water introduced through the fluid intake conduit 700 will be channeled through output conduit 702 into the interior of the float, causing the compressor to act as a liquid pump, thereby lowering the float in the water and lowering the center of gravity of the apparatus. Depending upon the ferocity of the storm, the float will eventually settle down the pilaster until caused to stop at an appropriate position below the water's surface, yet at a position which is readily retrievable once weather conditions have improved. Assuming the float is not completely swamped (in which case auxiliary bilge pumps may become necessary), by reversing the compressor (and by providing negative pressure valves in the interior of the float chamber) the compressor may automatically pump out the interior of a float, discharging the sea water through fluid intake means 700 to reestablish the float as a gas filled chamber.

FIG. 2 has been taken so that a portion of the bridging means 208 connecting it with an adjacent power collection unit is shown in cross-section, and will be seen to have a floor 210 under which are disposed a plurality of high pressure compressed air transmission conduits 212, 214, and 216.

Figure 3:
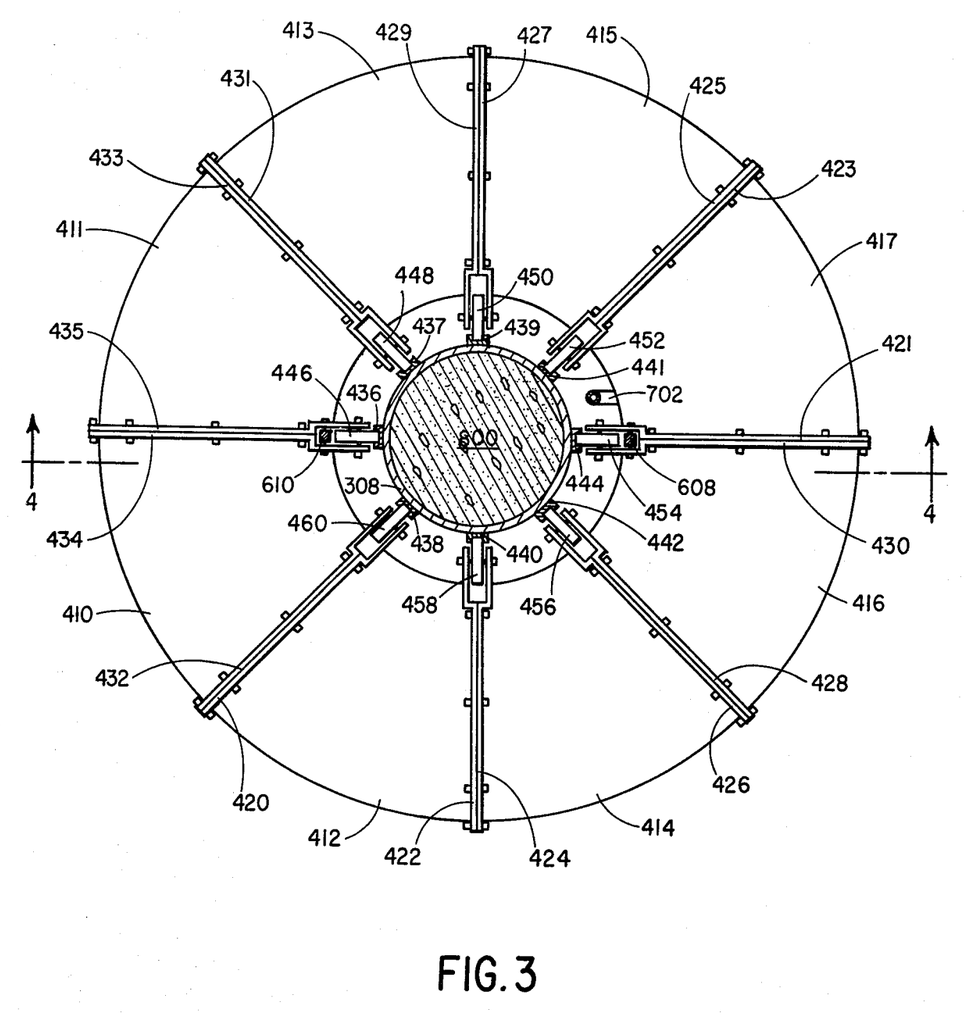
FIG. 3 is a cross-sectional top view of the embodiment illustrated in FIG. 2 taken as indicated by the lines and arrows 3—3 in FIG. 2.

Referring now in particular to FIG. 3, which is a cross-sectional top view of the apparatus shown in FIG. 2, the interrelationship between the toroidal float 408 and pilaster 308 is clearly illustrated. In FIG. 3 toroid sections 410, 411, 412, 413, 414, 415, 416, and 417 are illustrated as are outwardly depending flanges 420–435. As seen particularly in FIG. 3, these flanges mate with complemental flanges of adjacent sections for almost their entire length, however, the portions thereof which are disposed toward the toroid's center are differentiated into spaced apart flange portions which act as axle mounting assemblies for wheels 446, 448, 450, 452, 454, 456, 458, and 460 which move along tracks 436, 437, 439, 441, 444, 442, 440, and 448 respectively. Ballast 800 is provided in the center of the pilaster in order to weight the entire unit and increase both its strength and ability to withstand the tendency of ocean currents etc. to displace the unit.

Figure 4:
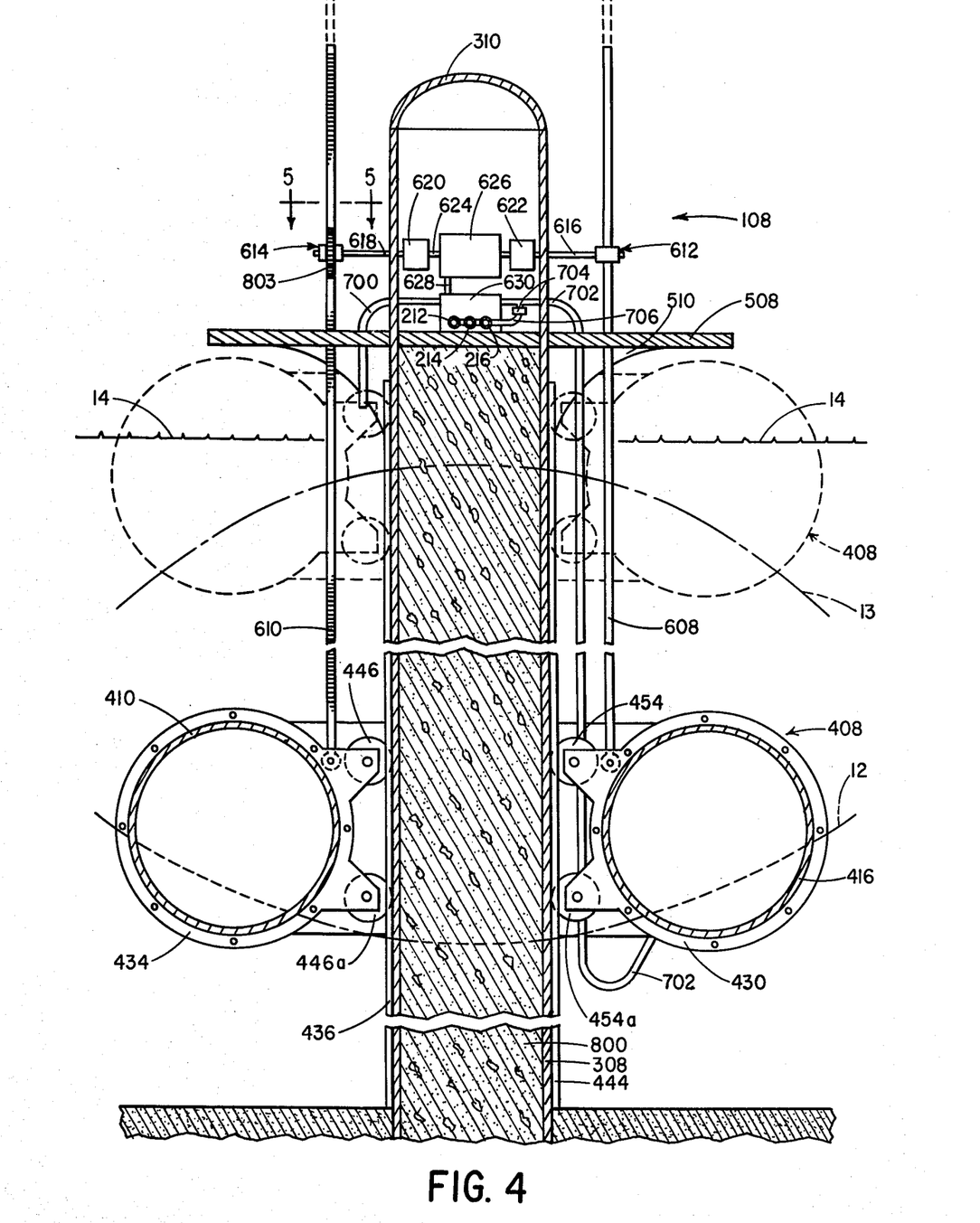
FIG. 4 is a cross-section of the embodiment shown in FIG. 2 taken as indicated by the lines and arrows 4—4 in FIG. 3.

Referring now in particular to FIG. 4, many of the features discussed above with reference to the other figures are also illustrated in FIG. 4. Additionally, FIG. 4, which is a cross-section of the power collection unit shown in FIGS. 2 and 3, depicts the machinery disposed within the upper hollow portion of pilaster 308, as well as additional wheel mounting and float details. In particular, clutched drive shafts 616 and 618 extend inwardly from pinion assemblies 612 and 614 to pass through openings in the pilasters to engage unidirectinal clutches 620 and 622. Since the tracks 608 and 610 are disposed on opposite sides of their respective pinion assemblies, both of these clutches may be either clockwise or counter-clockwise clutches so that one of the racks, such as rack 610 will act through pinion assembly 614, drive shaft 618, and clutch 620 to drive the main drive shaft 624 in a preferred rotational direction in response to the ascension of the float, while the other rack, rack 608, will act through pinion assembly 612, clutch drive shaft 616, and clutch 622 to continue driving the main drive shaft in that direction during the descension of the float. The clutches 620 and 622 allow their respective clutch shafts to idle with respect to the drive shaft upon the return strokes of the racks. A flywheel 626 is diagramatically illustrated disposed on main drive shaft 624, and a belt or other drive means 628 is shown spanning between the flywheel and compressor 630 so that the compressor is continuously driven by the flywheel and main drive shaft even though the power supplied thereto by either of the racks is discontinuous.

The output of compressor 630 is connected to output conduit 702 and also through a ball check valve 704 to transmission supply conduit 706. The ball check valve prevents any water which might enter the system from inadvertently being introduced into transmission conduits 212, 214, or 216, and additionally seals off those transmission conduits when the gas pressure within conduit 702 is less than the pressure within conduit 706.

FIG. 4 additionally shows the relative vertical orientations of each wheel set, such as wheel set 446 and 446a and wheel set 454 and 454a, which wheel sets are spaced apart and vertically aligned to move within a single pilaster track. By mounting two vertically spaced apart wheels between opposing flange portions from each of the sections, any tendency of the float to twist with respect to the pilaster is effectively resisted.

FIG. 4 also shows the pivotal attachment of racks 608 and 610 between opposing portions of flanges 430 and 421 for rack 608 and 434 and 435 for rack 610. An aperture formed at the float end of each rack is sized to receive a rod extending between these opposing flange portions. Since the rack aperture is somewhat oversized, some lateral play is accordingly created between the racks and the float.

In FIG. 4, the float is shown in its solid lined position buoyed by water level 12 which represents a wave or tidal trough, whereas the float 408 is shown in dotted outline buoyed to a greater nearly naximum height with respect to the pilaster on a wave or tidal crest, as indicated by phantom water level height 13. It should be noted in FIG. 4 that the height of the apparatus illustrated in FIG. 4 has been foreshortened in several places. While the deck 508 is designed to resist any forces which might be applied thereto by interference with the float 408, as described hereinabove, the height of the pilaster should not be made so short that the travel of the float is unduly limited by the deck position, but rather under most weather conditions the float should be free to move between its crest and trough positions. At the same time, by designing the apparatus with reference to an expected high water mark and by providing the preferred embodiment apparatus with various means for withstanding occasional water heights which may be substantially higher than the maximum expected high water line, expenditures for unduly high pilasters and other mechanisms which might otherwise be used only very infrequently are avoided.

Figure 5:
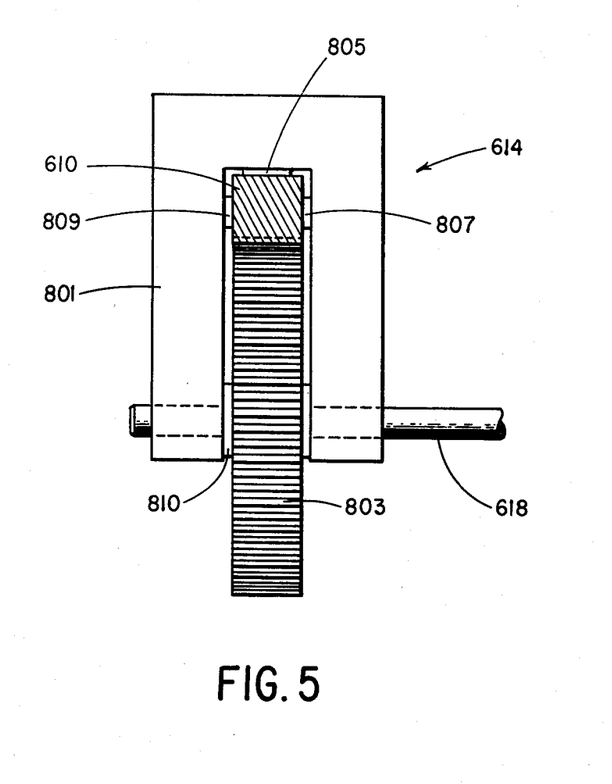
FIG. 5 is a cross-sectional top view on a greatly enlarged scale of a portion of the embodiment shown in FIG. 4 taken as indicated by the lines and arrows 5—5, in FIG. 4.

In FIG. 5, which is a top cross-sectioinal view on a greatly enlarged scale, the details of the pinion assembly designated generally 614 is illustrated. The pinion assembly is seen to comprise a substantially U-shaped rack follower assembly 801, the ends of which are journalled on the end of clutched drive shaft 618. A main drive gear 803 is attached to shaft 618 and is positioned between the two arms of the rack follower assembly. The rack 610, which is shown in cross-section in FIG. 5, is journalled between main drive gear 803 and bearings 805, 807, and 809 which are mounted on the inner surfaces of the rack follower assembly near the interior base of the "U". These bearings preferably are biased towards the rack yet provide enough forgiveness to prevent undue stress on the rack member. Similar bearings 810 are provided between the main drive gear 803 and the interior surfaces of the arms of the rack follower assembly 801 so that the movement of the rack 610 will ride smoothly so that axial movement of the rack 610 with respect to the main drive gear will produce a positive rotational driving of clutched shaft 618. Although not illustrated in the drawings, in an alternate embodiment of the present invention, a unidirectional clutch may be incorporated between the main drive gear 803 and the shaft on which it is mounted. In this instance, the main drive shaft 624 would extend substantially through the pinion assemblies, with the unidirectional clutching action taking place within those assemblies. It is also within the scope of the present invention, if desired, to provide additional bearing means at various places along the clutched and main drive shafts to further stabilize the pinion, flywheel, and clutched assemblies.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. A wave-power collection apparatus for installation in a large body of water for converting wave energy into high pressure compressed air, for collecting said air in said apparatus, and for transmitting said compressed air to a preselected consumption site, comprising:
   (a) at least three power collection means, each of which is embedded in the floor of said body of water and extends to protrude for a preselected distance above the high water line thereof; and
   (b) bridging means engaging portions of said power collection means above said high water line for rigidly interconnecting said power collection means said bridging mens extending from each of said power collection means to at least two adjacent ones of said power collection means to create a rigid collection module, said bridging means further comprising conduit means extending between said power collection means for transmitting compressed air to a preselected consumption site, and catwalk means for facilitating pedestrian movement between ones of said power collection means, said catwalk means comprising a substantially tubular bridging member having said conduit means disposed therein.

2. The invention of claim 1 wherein said substantially tubular bridging member has an elliptical cross-section.

3. The invention of claim 2 wherein the axis of said elliptical cross-section is substantially vertical.

4. A wave-power collection apparatus for installation in a large body of water for converting wave energy into high pressure compressed air, for collecting said air in said apparatus, and for transmitting said compressed air to a preselected consumption site, comprising:
   (a) at least three power collection means, each of which is embedded in the floor of said body of water and extends to protrude for a preselected distance above the high water line thereof, said power collection means further comprising a pilaster, one end of which is embedded in said floor and the other end of which protrudes above said water line, said pilaster being a substantially tubular member, and said power collection means further comprising ballast collection means disposed within at least that portion of said substantially tubular pilaster member which is located below the low water line for weighting said power collection means; and
   (b) bridging means engaging portions of said power collection means above said high water line for rigidly interconnecting said power collection means said bridging means extending from each of said power collection means to at least two adjacent ones of said power collection means to create a rigid collection module.

5. The invention of claim 4 wherein said ballast means comprises concrete.

6. The invention of claim 4 wherein said ballast means extends within said substantially tubular pilaster member to a level substantially above said high water line within said pilaster to form a floor therein.

7. A wave-power collection apparatus for installation in a large body of water for converting wave energy into high pressure compressed air, for collecting said air in said apparatus, and for transmitting said compressed air to a preselected consumption site, comprising:
   (a) at least three power collection means, each of which is embedded in the floor of said body of water and extends to protrude for a preselected distance above the high water line thereof, said power collection means further comprising a pilaster, one end of which is embedded in said floor and the other end of which protrudes above said high water line, and said power collection means further comprising a float means trackingly mounted on said pilaster for floating at the water surface, said float means comprising a plurality of substantially tubular sections, each of said sections being fluid-sealed with respect to its adjacent sections to form a fluid-tight gas chamber therein; and
   (b) bridging means engaging portions of said power collection means above said high water line for rigidly interconnecting said power collection means said bridging means extending from each of said power collection means to at least two adjacent ones of said power collection means to create a rigid collection module.

8. The invention of claim 7 wherein each of said tubular sections terminates in outwardly depending flanges, each of which flanges engage complementally formed flanges on adjacent tubular sections to create said fluid-tight seal.

9. The invention of claim 7 wherein said float means encircles said pilaster and is trackingly mounted with respect thereto for movement in response to variations in the level of said water in directions substantially parallel to the axis of said pilaster.

10. The invention of claim 9 wherein said float means is substantially toroidal.

11. A wave-power collection apparatus for installation in a large body of water for converting wave energy into high pressure compressed air, for collecting said air in said apparatus, and for transmitting said compressed air to a preselected consumption site, comprising:
   (a) at least three power collection means, each of which is embedded in the floor of said body of water and extends to protrude for a preselected distance above the high water line thereof, said power collection means further comprising a pilaster, one end of which is embedded in said floor and the other end of which protrudes above said high water line, said power collection means further comprising a float means trackingly mounted on said pilaster for floating at the water's surface, and an air compressor means for compressing air, said air compressor means being disposed within said pilaster, and said power collection means further comprising power transmission means for converting and transmitting the movement of said float means resulting from variations in the level of said water to said compressor means to drive the compressor means, an output of said compressor means being in fluid communication with said conduit means, said conduit means and said output being disposed in fluid communication with the fluid-tight gas chamber defined within said float means, whereby said float means may act as a reservoir for compressed air produced by said compressor means; and (b) bridging means engaging portions of said power collection means above said high water line for rigidly interconnecting said power collection means said bridging means extending from each of said power collection means to at least two adjacent ones of said power collection means to create a rigid collection module.

12. A wave-power collection apparatus for installation in a large body of water for converting wave energy into high pressure compressed air, for collecting said air in said apparatus, and for transmitting said compressed air to a preselected consumption site, comprising:

(a) at least three power collection means, each of which is embedded in the floor of said body of water and extends to protrude for a preselected distance above the high water line thereof, said power collection means further comprising a pilaster, one end of which is embedded in said floor and the other end of which protrudes above said high water line, said power collection means further comprising a float means trackingly mounted on said pilaster for floating at the water's surface, said power collection means further comprising track means disposed substantially between said float means and said pilaster, for guiding the movement of said float means with respect to said pilaster, said tracking means further comprising a plurality of inwardly depending wheels mounted on said float means, and said pilaster having disposed on an outer surface thereof at least one track for receiving and guiding said wheels along a preselected axis with respect to said pilaster, said float means comprising a plurality of arcuate, tubular sections, each of said sections being fluid-sealed with respect to its adjacent sections to form a fluid-tight chamber therein, each of said tubular sections terminating in outwardly depending flanges, spaced apart portions of each of said flanges comprising wheel mounting means for mounting one of said tracking wheels on said float means; and (b) bridging means engaging portions of said power collection means above said high water line for rigidly interconnecting said power collection means said bridging means extending from each of said power collection means to at least two adjacent ones of said power collection means to create a rigid collection module.

13. The invention of claim 12 wherein said wheel mounting means further comprises an axle extending between portions of said flanges, said axle having said one of said wheels mounted for rotation therearound.

14. A wave-power collection apparatus for installation in a large body of water for converting wave energy into high pressure compressed air, for collecting said air in said apparatus, and for transmitting said compressed air to a preselected consumption site, comprising:

(a) at least three power collection means, each of which is embedded in the floor of said body of water and extends to protrude for a preselected distance above the high water line thereof, said power collection means further comprising a pilaster, one end of which is embedded in said floor and the other end of which protrudes above said high water line, said power collection means further comprising a float means trackingly mounted on said pilaster for floating at the water's surface, and an air compressor means for compressing air, said air compressor means being disposed within said pilaster, and said power collection means further comprising power transmission means for converting and transmitting the movement of said float means resulting from variations in the level of said water to said compressor means to drive the compressor means, said power transmission means further comprising a drive shaft mounted for rotation in a preselected rotational direction, swell drive means for driving said drive shaft in said rotational direction in response to the ascension of said float with respect to said pilaster, and gravitational drive means for driving said drive shaft in said rotational direction in response to descension of said float relative to said pilaster, said swell drive means and said gravitational drive means each comprising a rack, a shaft mounted pinion, and a unidirectional clutch mounted on said main drive shaft, said power transmission further comprising a flywheel mounted on said shaft, said compressor means, said flywheel and at least portions of said drive shaft being disposed within said pilaster; and (b) bridging means engaging portions of said power colllection means above said high water line for rigidly interconnecting said power collection means, said bridging means extending from each of said power collection means to at least two adjacent ones of said power collection means to create a rigid collection module.

15. The invention of claim 14 wherein said power collection means further comprises roof means disposed at the top of said pilaster for creating a weather-proof chamber within at least a portion of said pilaster above said high water mark.

16. A wave-power collection apparatus for installation in a large body of water for converting wave energy into high pressure compressed air, for collecting said air in said apparatus, and for transmitting said compressed air to a preselected consumption site, comprising:

(a) at least three power collection means, each of which is embedded in the floor of said body of water and extends to protrude for a preselected distance above the high water line thereof, said power collection means further comprising a pilaster, one end of which is embedded in said floor and the other end of which protrudes above said high water line, said power collection means further comprising a float means trackingly mounted on said pilaster for floating at the water's surface, and an air compressor means for compressing air, said air compressor means being disposed within said pilaster, and said power collection means further comprising power transmission means for converting and transmitting the movement of said float means resulting from variations in the level of said water to said compressor means to drive the compressor means, said power transmission means further comprising a drive shaft mounted for rotation in a preselected rotational direction, swell drive means for driving said shaft in said rotational direction in response to the ascension of said float with respect to said pilaster, and gravitational drive means for driving said drive shaft in said rotational direction in response to descension of said float relative to said pilaster, said swell drive means and said gravitational drive means each comprising a rack, a shaft mounted pinion, and unidirectional clutch mounted on said main drive shaft, said rack being pivotally attached to at least a portion of said float means; and (b) bridging means engaging portions of said power collection means above said high water line for rigidly interconnecting said power collection means said bridging means extending from each of said power collection means to at least two adjacent ones of said power collection means to create a rigid collection module.

17. The invention of claim 16 wherein said rack is pivotally attached to an outwardly depending flange formed on said float means.

* * * * *

UNITED STATES PATENT AND TRADEMARK OFFICE
CERTIFICATE OF CORRECTION

PATENT NO. : 4,206,601
DATED : June 10, 1980
INVENTOR(S) : William J. Eberle

It is certified that error appears in the above-identified patent and that said Letters Patent are hereby corrected as shown below:

On the information page, the following should be deleted:

"[73] Assignee: Benasutti Asst., Ltd., 1617 J.F. Kennedy Blvd."

Signed and Sealed this

Twenty-third Day of September 1980

[SEAL]

Attest:

SIDNEY A. DIAMOND

Attesting Officer    Commissioner of Patents and Trademarks